United States Patent
Boardman

(12) 
(10) Patent No.: US 6,519,308 B1
(45) Date of Patent: Feb. 11, 2003

(54) CORROSION MITIGATION SYSTEM FOR LIQUID METAL NUCLEAR REACTORS WITH PASSIVE DECAY HEAT REMOVAL SYSTEMS

(75) Inventor: Charles E. Boardman, Saratoga, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/385,719

(22) Filed: Aug. 30, 1999

Related U.S. Application Data

(60) Provisional application No. 60/138,952, filed on Jun. 11, 1999.

(51) Int. Cl.[7] ............................................. G21C 11/08
(52) U.S. Cl. ..................... 376/287; 376/272; 376/290; 376/293; 376/294; 376/295; 376/299; 376/298; 376/404; 376/405; 376/296
(58) Field of Search .................................. 376/298, 299, 376/293, 294, 295, 404, 405, 290, 272, 296, 287

(56) References Cited

U.S. PATENT DOCUMENTS

| | | | |
|---|---|---|---|
| 3,830,695 A | * 8/1974 | Sauvage ...................... | 176/38 |
| 3,888,730 A | * 6/1975 | Jackson | |
| 4,050,986 A | * 9/1977 | Ference et al. ................ | 176/61 |
| 4,186,049 A | * 1/1980 | Blum et al. | |
| 4,356,146 A | * 10/1982 | Knappe et al. .............. | 376/272 |
| 4,508,677 A | 4/1985 | Craig et al. .................. | 376/174 |
| 4,678,626 A | * 7/1987 | Germer ....................... | 376/298 |
| 5,043,135 A | * 8/1991 | Hunsbedt et al. ............ | 376/299 |
| 5,043,136 A | * 8/1991 | Hunsbedt et al. (III) .... | 376/299 |
| 5,049,353 A | * 9/1991 | Conway et al. .............. | 376/293 |
| 5,158,741 A | 10/1992 | Boardman et al. ........... | 376/299 |
| 5,169,596 A | * 12/1992 | Orr .............................. | 376/293 |
| 5,190,720 A | * 3/1993 | Hunsbedt et al. ........... | 376/287 |
| 5,406,602 A | * 4/1995 | Hunsbedt et al. | |
| 5,499,277 A | * 3/1996 | Hunsbedt ..................... | 376/299 |

FOREIGN PATENT DOCUMENTS

| | | | | |
|---|---|---|---|---|
| DE | 1937627 | * | 2/1971 | |
| GB | 0964841 | * | 7/1964 | |
| GB | 1421826 | * | 1/1976 | |
| GB | 2096520 A | * | 10/1982 | ........... G21F/27/00 |

OTHER PUBLICATIONS

GEC Energy Systems, Publication ESL–42.*
GEC Energy Systems Limited (1976) Wylfa Nuclear Power Station, Wales, Great Britain.*

* cited by examiner

*Primary Examiner*—Michael J. Carone
*Assistant Examiner*—John Richardson
(74) *Attorney, Agent, or Firm*—Armstrong Teasdale LLP

(57) ABSTRACT

A liquid metal nuclear reactor is described. The reactor includes a concrete reactor silo, and at least one primary vessel located in the reactor silo and coupled to a reactor shield deck. Each primary vessel is substantially surrounded by a containment vessel in a spaced apart relationship. The reactor also includes a heat removal system which includes a guard vessel substantially surrounding each containment vessel in a spaced apart relationship, at least one inlet conduit in fluid communication with the ambient atmosphere outside the nuclear reactor, and at least one outlet conduit in fluid communication with the ambient atmosphere outside the nuclear reactor. A fluid flow heat transferring flowpath is formed by the inlet conduits, the space intermediate the guard vessel of each primary vessel and the containment vessel of each primary vessel and the outlet conduits. The heat removal system also includes at least one heat exchanger in said the flowpath to elevate the temperature of the air coolant so that the temperature remains above the dew point temperature as the air coolant flows through the flowpath.

23 Claims, 4 Drawing Sheets

CORROSION MITIGATION SYSTEM FOR LIQUID METAL NUCLEAR REACTORS WITH PASSIVE DECAY HEAT REMOVAL SYSTEMS

CROSS-REFERENCE TO RELATED PATENTS

This application claims the benefit of U.S. Provisional Application No. 60/138,952, filed Jun. 11, 1999.

BACKGROUND OF THE INVENTION

This invention relates generally to nuclear reactors and more particularly, to liquid metal nuclear reactors with passive decay heat removal systems.

Known liquid metal reactors typically include a radioactive primary system composed of a core, primary pump and intermediate heat exchanger (IHX) and a non-radioactive secondary sodium loop which transfers the heat gained in the IHX to a steam generator. The key primary system components (core, IHX, and primary pump) may be placed in a single large reactor vessel (pool arrangement) or they may be placed in separate vessels and connected together by piping (loop arrangement). In a Top Entry Loop (TEL) arrangement the primary piping is composed of very short inverted U-tube shaped pipes that are located above the component vessels in order to prevent a coolant loss in the event that the piping is breached. This arrangement also minimizes the length of primary sodium piping and the size (foot print) of the primary system itself.

In the loop concept the component vessels are connected together by the primary piping in a manner that circulates the coolant through the reactor core located in the reactor vessel to the IHX vessel and then to the pump vessel before it is returned to the core. This process is continuously repeated during operation in order to continue transferring core produced heat to the non-radioactive secondary sodium in the IHX. The reactor vessel and the satellite vessels are housed inside a concrete vault. The same flow path between the primary components is utilized in a pool type plant except that all of the components are located within the same vessel.

To protect the reactor structures from overheating following reactor shut down and loss of the normal shutdown heat removal system, a shutdown decay heat removal system is provided. This system may be composed of either: (1) redundant auxiliary liquid metal loops that transfer heat from small auxiliary IHX units to the atmosphere via auxiliary secondary sodium to air dump heat exchangers; or (2) by providing an air flow path that will allow natural circulating air to flow past the component vessel(s) where it removes the shutdown decay heat by convective heat transfer from the vessels while also cooling the primary vault. Residual heat removal systems are typically referred to as Decay Heat Removal Systems (DHRS). Passive DHRS include a plurality of pathways that permit outside air to enter the reactor silo and flow past the exterior of the primary vessel(s) and then exit the reactor silo carrying the decay heat to the atmosphere.

In the event of a reactor vessel leak, a loss of coolant accident is prevented by enclosing he sodium containing vessel(s) inside a separate close coupled guard vessel that also serves as the lower portion of the containment. A severe loss of coolant accident can not occur unless both the reactor and the guard or lower containment vessels fail at the same time.

In many locations around the world, nuclear power plants are located near the sea. This means that the components that are utilized in the DHRS which transfer decay heat from the reactor to the atmosphere are exposed to moist salt laden air. The moist salt air can increase the potential for corrosion within the DHRS. Especially if the temperature of the moist salt containing air is below the dew point, and salt water condenses on the DHRS components.

It would be desirable to provide a liquid metal nuclear reactor that includes a passive natural circulating DHRS that guards against increased corrosion from moist salt laden air and can also prevent a severe loss of coolant accident in the event that a double vessel breach occurs.

BRIEF SUMMARY OF THE INVENTION

A liquid metal reactor is provided that includes in one embodiment a DHRS that prevents the incoming cooling air from dropping below the dew point before the air contacts critical reactor components. By maintaining the temperature of the incoming air above the dew point, an essential element in the corrosion process, the electrolyte, is not present in the DHRS and the potential for corrosion within the flowpaths of the DHRS is greatly reduced.

The reactor includes a concrete reactor vault, and at least one primary vessel located in the reactor vault and coupled to a reactor shield deck. Each primary vessel is substantially surrounded by a containment vessel in a spaced apart relationship. The reactor also includes a heat removal system which includes a guard vessel substantially surrounding each containment vessel in a spaced apart relationship, at least one inlet conduit in fluid communication with the ambient atmosphere outside the nuclear reactor, and at least one outlet conduit in fluid communication with the ambient atmosphere outside the nuclear reactor. A fluid flow heat transferring flowpath is formed by the inlet conduits, the space intermediate the guard vessel of each primary vessel and the containment vessel of each primary vessel, and the outlet conduits. The heat removal system also includes at least one heat exchanger in the flowpath to elevate the temperature of the air coolant so that the temperature remains above the dew point temperature as the air coolant flows through the flowpath.

The heat removal system also includes a second flowpath formed by at least one vault inlet conduit, the space intermediate the guard vessel and the concrete reactor silo, at least one vault outlet conduit, and at least one heat exchanger to maintain the temperature of the air coolant above the dew point temperature as the air coolant flows through the second flowpath.

The above describe liquid metal reactor eliminates the potential for corrosion within the ducts, pathways and structures which guide outside air past the reactor containment vessel(s) to transfer reactor core decay heat from the reactor to the ambient air outside the reactor by utilizing the removed heat to raise the temperature of the incoming air above the dew point. In addition, the guard vessel of the above described reactor will prevent a radiological release from occurring in the event that both the reactor and containment vessels fail. The reactor also maintains decay heat removal during such a double vessel leak by maintaining reactor vault cooling. Also, the reactor provides a lower cost method of supporting the reactor deck from which the primary vessel(s) are hung.

DETAILED DESCRIPTION OF THE INVENTION

Figure 1:
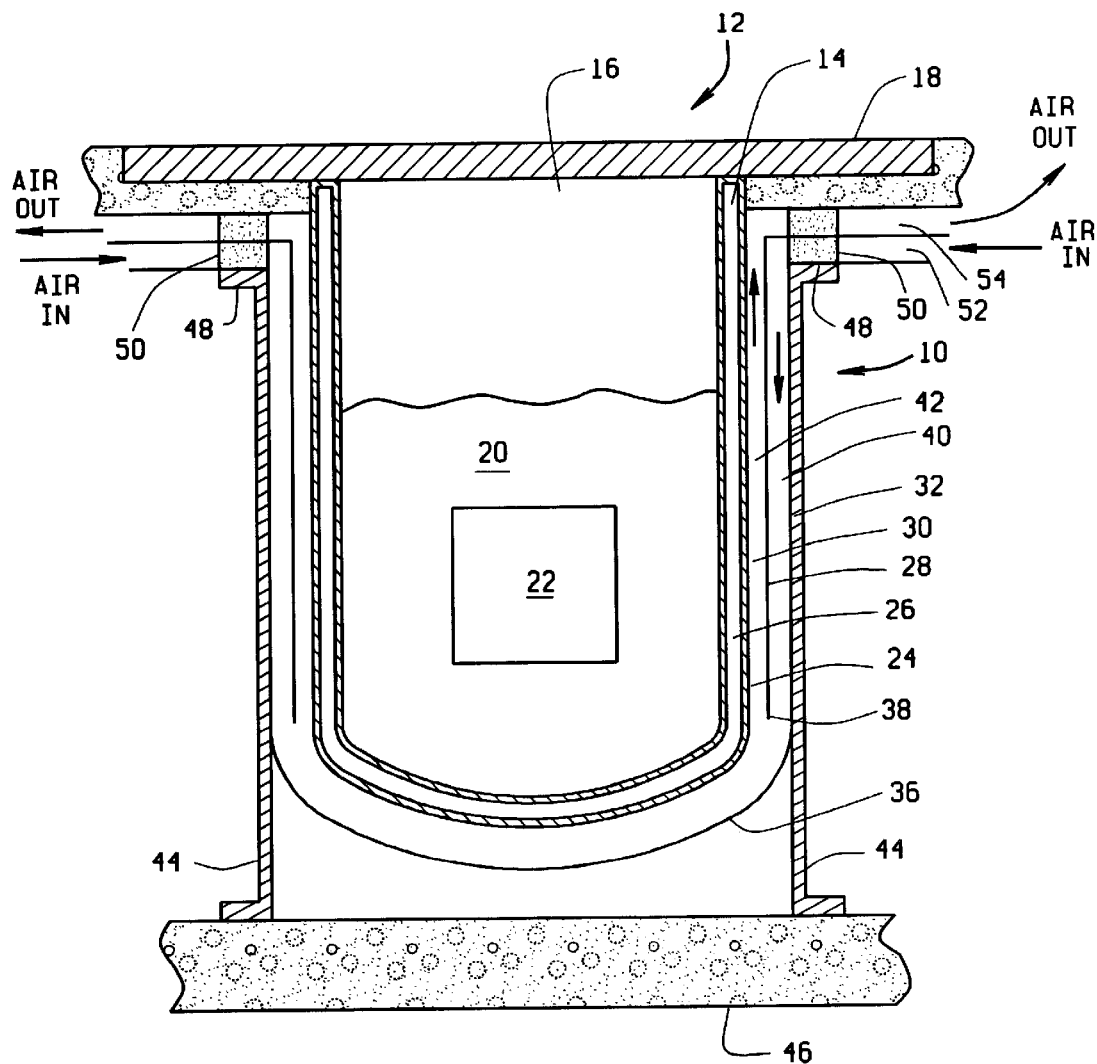
FIG. 1 is a sectional schematic view of a passive decay heat removal system for a pool type liquid metal nuclear reactor.

FIG. 1 is a sectional schematic view of a passive decay heat removal system 10 for a pool type liquid metal nuclear reactor 12. Nuclear reactor 12 includes a reactor primary vessel 14 consisting of a cylindrical tank positioned with the longitudinal axis extending vertically upward, and having an open upper end 16 attached to and covered by a shield deck 18. Reactor primary vessel 14 contains a pool of liquid metal coolant 20, such as sodium metal, with a heat producing core of fissionable fuel material 22 substantially submerged within liquid metal pool 20. The rate of fission of the fuel material is governed by neutron absorbing control rods (not shown) that move into and out of the fuel core 22.

Reactor primary vessel 14 is enclosed within a concentrically surrounding containment vessel 24 in a spaced apart relationship. A space 26 between reactor primary vessel 14 and containment vessel 24 is sealed and is typically filled with a relatively inert gas such as nitrogen or argon. A baffle cylinder 28 concentrically encircles substantially the length of containment and reactor vessels 24 and 14 in spaced apart relation to an outer wall 30 of containment vessel 24. A guard vessel 32 concentrically surrounds baffle cylinder 28 in spaced apart relation to outer wall 34 of baffle cylinder 28. Baffle cylinder 28 extends downward between containment vessel 24 and guard vessel 32 substantially to a bottom portion of reactor primary vessel 14, with baffle cylinder terminating a short distance above the bottom 36 of guard vessel 32. Thus, baffle cylinder 28 provides for fluid communication below a lower end 38 between a space 40 intermediate guard vessel 34 and cylindrical baffle 28 and a space 42 intermediate baffle cylinder 28 and containment vessel 24.

Guard vessel 32 includes a support skirt 44 which rests on base mat 46. Guard vessel 32 also includes an upper support flange 48. A plurality of shield deck support pillars 50 extend between upper support flange 48 and shield deck 18 which enable shield deck 18 to be supported by base mat 46 and guard vessel 32.

Reactor 12 also includes an ambient air inlet conduit 52, in fluid communications with space 40, and an air outlet conduit 54, in fluid communications with space 42. Passive decay heat removal system 10 combines air inlet conduit 52, space 40, space 42 and air outlet conduit 54.

Passive decay heat removal system 10 removes heat produced by reactor core 22. In operation, heat produced by reactor core 22 is conveyed outward from core 22 to reactor primary vessel 14 by the natural convection of liquid metal coolant 20. The heat is then transferred mainly by thermal radiation across inert gas containing space 26 to containment vessel 24. The heat is absorbed by air contained in space 42 which is in contact with containment vessel 24 and is carried along in an upward air flow resulting from the added heat inducing a natural draft within space 42 and outlet conduit 54. The natural draft causes fresh air to be drawn into inlet conduit 52, through spaces 40 and 42, and out through outlet duct 54.

Figure 2:
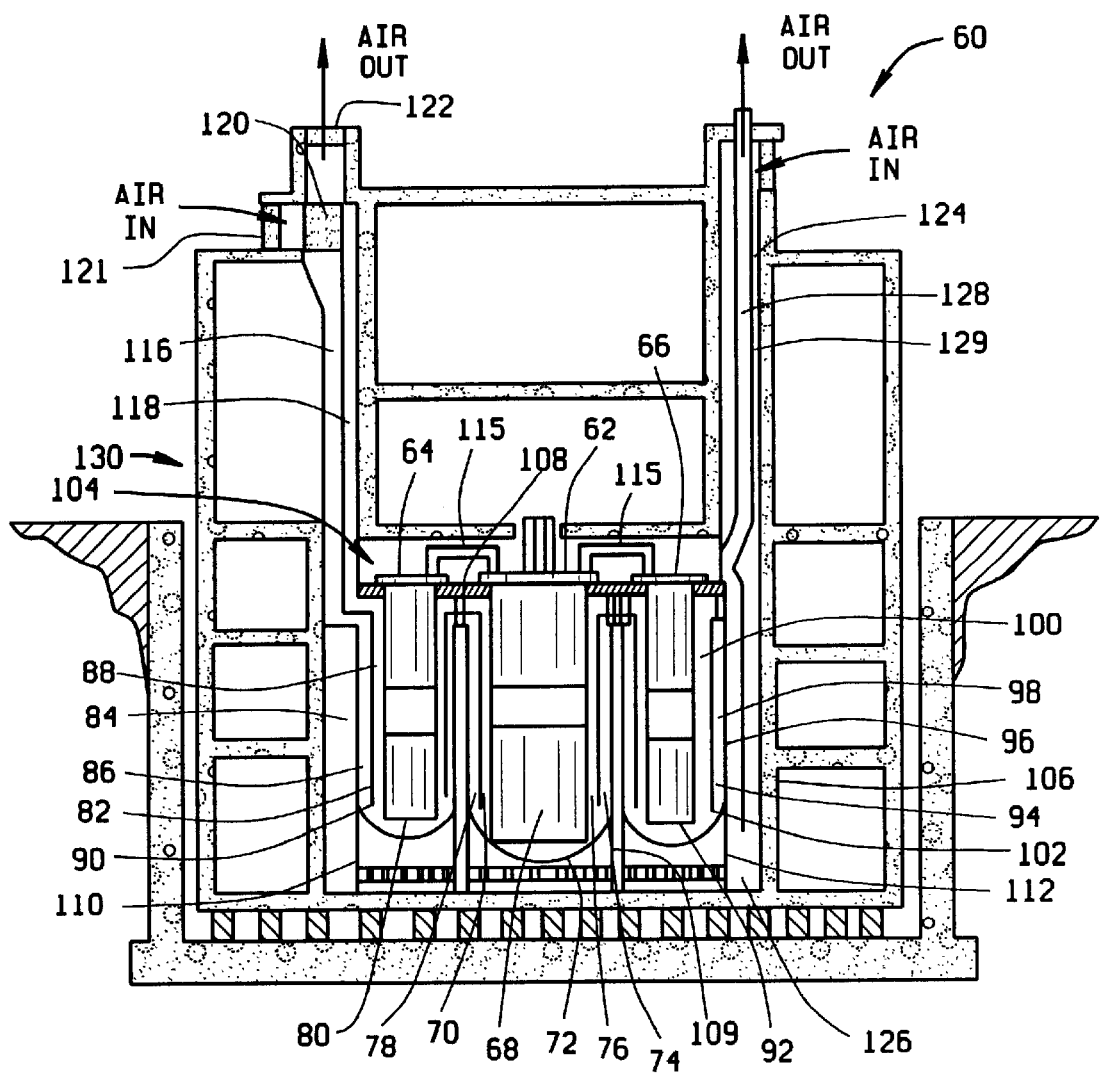
FIG. 2 is a sectional schematic view of a top entry loop type liquid metal nuclear reactor in accordance with one embodiment of the present invention.

FIG. 2 is a sectional schematic view of a top entry loop (TEL) type liquid metal nuclear reactor 60 in accordance with one embodiment of the present invention. A TEL type reactor includes a group of separated primary coolant containing vessels with each performing a specific role or function. Specifically, reactor 60 includes a primary unit 62 containing a reactor core (not shown) for producing energy, a pump unit 64 for inducing circulation of the liquid metal coolant, and a heat exchanger unit 66 for transferring the produced heat carried by the primary liquid metal coolant to a non-radioactive secondary coolant used to generate steam to drive a turbine generator to produce electricity.

Similar to reactor 12 described above, primary unit 62 includes a reactor primary vessel enclosed within a concentrically surrounding containment vessel 68 in a spaced apart relationship. A baffle cylinder 70 concentrically encircles substantially the length of containment vessel 68 in spaced apart relation. A guard vessel 72 concentrically surrounds baffle cylinder 70 in spaced apart relation. Spaces 74 and 76 are formed between guard vessel 72 and baffle cylinder 70 and between containment vessel 68 and baffle cylinder 70 respectively. Spaces 74 and 76 are in fluid communications with each other at a lower end 78 of baffle cylinder 70.

Pump unit 64 and heat exchanger unit 66 have similar construction. Particularly, pump unit 64 includes a pump vessel enclosed in a pump containment vessel 80, a baffle cylinder 82 concentrically encircling the length of containment vessel 80 and a guard vessel 84 concentrically surrounding baffle cylinder 82 in spaced apart relation. Spaces 86 and 88 are formed between guard vessel 84 and baffle cylinder 82 and between containment vessel 80 and baffle cylinder 82 respectively. Spaces 86 and 88 are in fluid communications with each other at a lower end 90 of baffle cylinder 82.

Heat exchanger unit 66 includes a heat exchanger vessel enclosed in a containment vessel 92, a baffle cylinder 94 concentrically encircling the length of containment vessel 92 and a guard vessel 96 concentrically surrounding baffle cylinder 94 in spaced apart relation. Spaces 98 and 100 are formed between guard vessel 96 and baffle cylinder 94, and between containment vessel 92 and baffle cylinder 94 respectively. Spaces 98 and 100 are in fluid communications with each other at a lower end 102 of baffle cylinder 94.

Spaces 74, 86, and 98 are in fluid communications with each other at an upper end 104 of units 62, 64, and 66. Spaces 76, 88, and 100 are in fluid communications with each other at upper end 104 of units 62, 64, and 66.

Primary coolant containing vessels 62, 64, and 66 are housed in a concrete reactor vault 106. Typically, concrete vault 106 is located substantially underground so that primary vessels 62, 64, and 66 are below ground level. Units 62, 64, and 66 are attached to and covered by a shield deck 108. Guard vessels 72, 84, and 96 include support skirts 109, 110, and 112 respectively which rest on seismically isolated base mat 114. Guard vessels 72, 84, and 96 are coupled to and support shield deck 108. Flow passages are provided in guard vessels 72, 84, and 96 to permit horizontal air flow in air inlet 116 and air outlet 118 plenums.

Reactor units 62, 64, and 66 are connected by a plurality of top entry loops 115 which permit the flow of liquid metal coolant between units 62, 64, and 66.

Reactor 60 also includes a plurality of ambient cooling air inlet conduits 116 (one shown) which are in fluid communications with spaces 74, 86, and 98, and a plurality of air outlet conduits 118 (one shown) which are in fluid communication with spaces 76, 88, and 100. Each ambient inlet conduit 116 and each air outlet conduit 118 is coupled to a regenerative air-to-air heat exchanger 120. Heat exchangers 120 transfers a portion of the heat carried by the air flowing through outlet conduits 118 to the ambient air flowing through inlet conduits 116 to raise the temperature of the inlet air so that the air is above the dew point. By maintaining the temperature of the cooling air above the dew point, any moisture carried by the air will not condense on the reactor components. Therefore, an essential element in the corrosion process, the electrolyte, is not present in the reactor decay heat removal system that includes inlet and outlet conduits 116 and 118, and spaces 74, 76, 86, 88, 98, and 100. Without an electrolyte present, the potential for corrosion is greatly reduced.

Reactor 60 also includes a passive reactor vault cooling system to remove heat from reactor vault 106. A plurality of ambient air inlets 124 (one shown) are in fluid communications with a space 126 formed by concrete vault 106 and guard vessels 72, 84, and 96. Also a plurality of air outlets 128 (one shown) are in fluid communications with space 126. Air inlet conduits 124 direct ambient cooling air into space 126 where the air absorbs heat by contacting guard vessels 72, 84, and 96 and then removes the heat by exiting space 126 through air outlet conduits 128.

Air inlet conduits 124 and air outlet conduits 128 are configured in a co-axial arrangement with each outlet conduit 128 positioned inside and co-axial with inlet conduit 124. Heat is transferred from the air flowing in outlet conduit 128 through an outlet conduit wall 129 to the ambient air flowing in inlet conduit 124 to raise the temperature of the incoming air above the dew point.

Decay heat is removed from reactor 60 by a passive decay heat removal system 130 which includes air inlet conduits 116, spaces 74, 76, 86, 88, 98, and 100, air outlet conduits 118 and regenerative heat exchangers 120. Heat generated in primary unit 62 is transferred by thermal radiation to containment vessels 68, 80, and 92 from the liquid metal coolant circulating within primary coolant vessels 62, 64, and 66. The heat is absorbed by air contained in spaces 76, 88, and 100 which are in contact with containment vessels 68, 80, and 92 respectively and is carried along in an upward air flow resulting from the added heat inducing a natural draft within spaces 76, 88, and 100 and outlet conduits 118. The natural draft causes fresh air to be drawn into inlet conduits 116, through spaces 74, 86, 98, heated in spaces 76, 88, and 100, and out through outlet conduits 118. A portion of the heat carried in outlet conduits 118 is transferred to the incoming air in inlet conduits 116 by regenerative heat exchangers 120.

Reactor vault 106 is similarly cooled by ambient air entering through vault inlet conduits 124 flowing through space 126 and exiting through vault outlet conduits 128. Incoming air is maintained above the dew point by the transfer of heat from outlet conduit 128 to inlet conduit 124 because of the co-axial arrangement of inlet and outlet conduits 124 and 128.

In other embodiments, inlet and outlet conduits 114 and 116 can be in co-axial arrangement to transfer heat to the incoming air to raise its temperature above the dew point instead of using heat exchangers 120. Also vault inlet and outlet conduits 124 and 128 can pass through a regenerative heat exchanger rather than be in a co-axial arrangement to transfer heat to the incoming air.

In the unlikely event of a double vessel leak, for example where both the reactor vessel and containment vessel 68 leak, air inlet damper 121 and air outlet damper 122 can be closed to prevent burning of the sodium coolant and prevent a radioactive release. In this event, decay heat is removed from reactor system 60 by reactor vault 106 air inlet 124 and air outlet 128.

Figure 3:
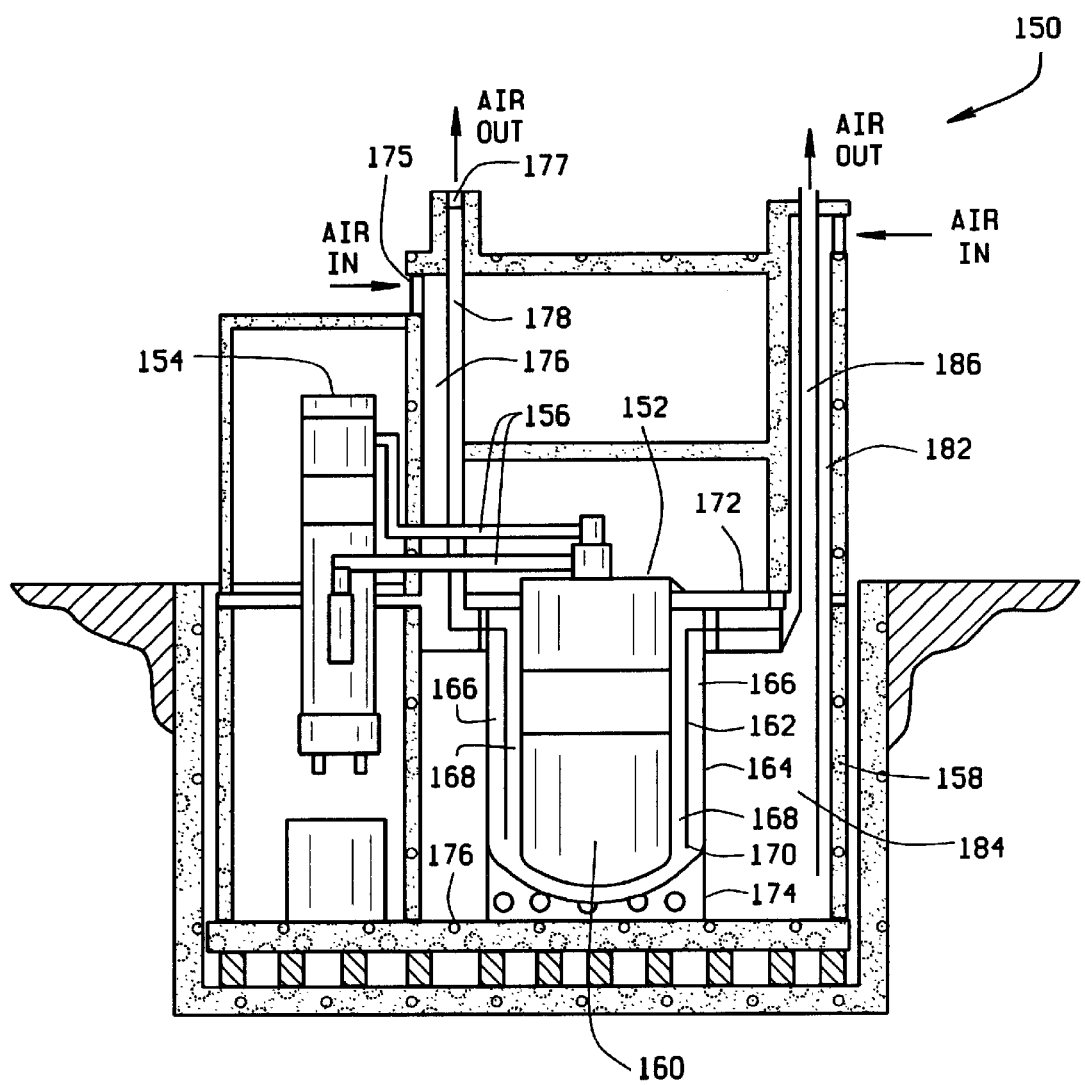
FIG. 3 is a sectional schematic view of a pool type liquid metal nuclear reactor in accordance with another embodiment of the present invention.
Figure 4:
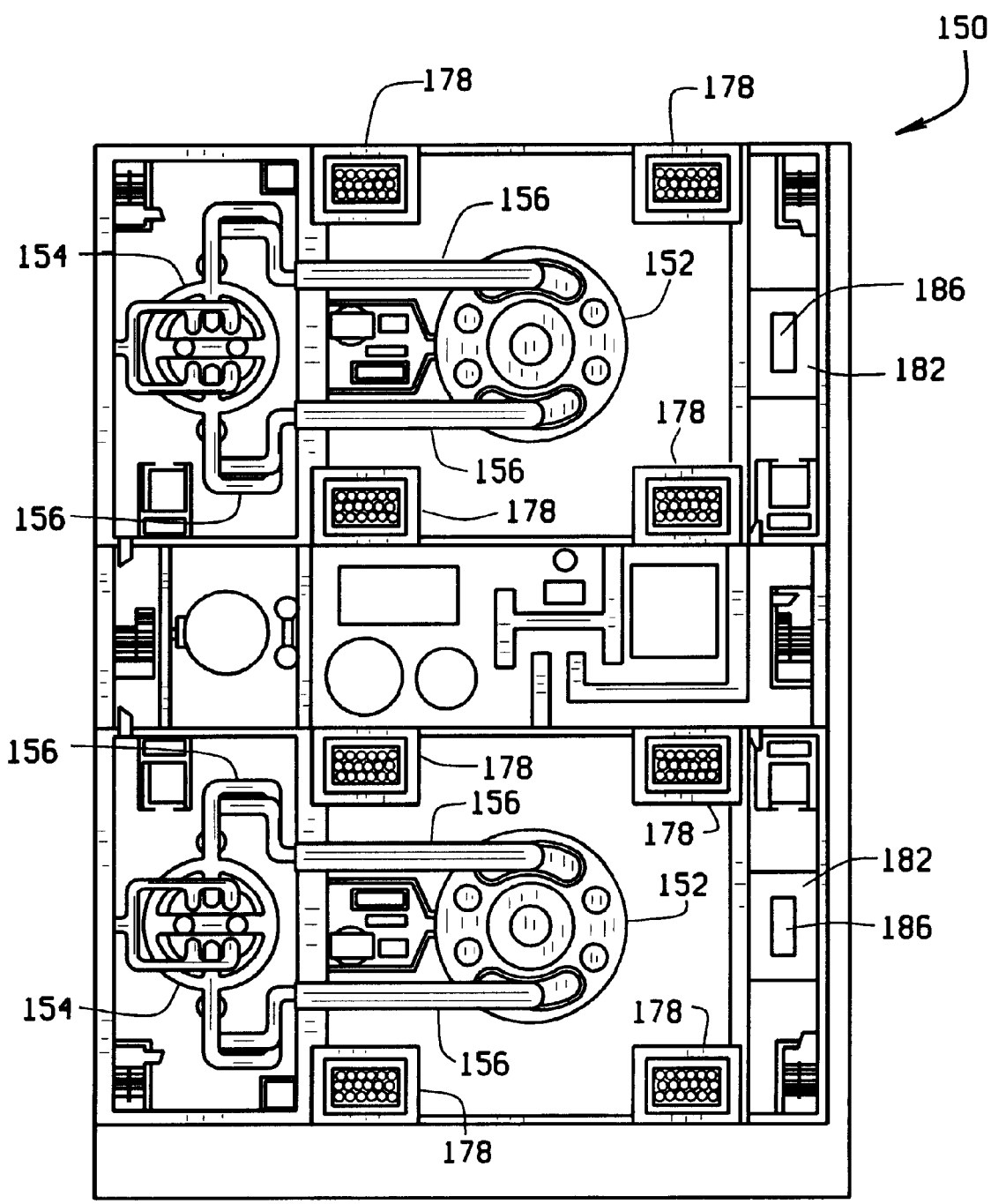
FIG. 4 is a top schematic view of the liquid metal nuclear reactor shown in FIG. 3.

FIG. 3 is a sectional schematic view of a liquid metal nuclear reactor 150 and FIG. 4 is a top schematic view of liquid metal nuclear reactor 150 in accordance with another embodiment of the present invention. Reactor 150 is a pool type liquid metal reactor that includes a plurality of primary reactor units 152 and a plurality of corresponding steam generator units 154 coupled to primary units 152 by liquid metal circulating conduits 156. Primary units 152 and steam generator units 154 are located in a concrete vault 158. Similar to reactor 12 described above, reactor primary units 152 each include a primary reactor vessel enclosed within a concentrically surrounding containment vessel 160 in a spaced apart relationship. A baffle cylinder 162 concentrically encircles substantially the length of containment vessel 160 in spaced apart relation. A guard vessel 164 concentrically surrounds baffle cylinder 162 in spaced apart relation. Spaces 166 and 168 are formed between guard vessel 164 and baffle cylinder 162 and between containment vessel 160 and baffle cylinder 162 respectively. Spaces 166 and 168 are in fluid communications with each other at a lower end 170 of baffle cylinder 162.

Reactor units 152 are attached to and covered by a shield deck 172. Guard vessels 164 includes a support skirt 174 which rests on seismically isolated base mat 176. Guard vessels 164 are coupled to and support shield deck 172. Reactor 150 also includes ambient air inlet conduit 173, in fluid communications with space 166, and an air outlet conduit 178, in fluid communications with space 168.

Reactor 150 also includes a passive reactor vault cooling system to remove heat from the reactor vault 158. A plurality of ambient air inlet conduits 182 are in fluid communications with a space 184 formed by concrete vault 158 and guard vessels 164. Also a plurality of air outlet conduits 186 are in fluid communications with space 184. Air inlet conduits 182 direct ambient cooling air into space 184 where the air absorbs heat by contacting guard vessels 164 and then removes the heat by exiting space 184 through air outlet conduits 186.

Air inlet conduits 182 and air outlet conduits 186 are configured in a co-axial arrangement with each outlet conduit 186 positioned inside and co-axial with a corresponding inlet conduit 182. Heat is transferred from the air flowing in outlet conduit 186 through an outlet conduit wall 188 to the ambient air flowing in inlet conduit 182 to raise the temperature of the incoming air above the dew point.

In the event of a double vessel leak, decay heat removal is maintained by closing an inlet damper 175 and an outlet damper 177, located in inlet conduit 173 and outlet conduit 178 respectively, and permitting the reactor vault cooling system to remove the decay heat by convection from guard vessel 164, as described above.

In an alternate embodiment, the liquid metal reactor does not include a third or guard vessel and decay heat is removed by air circulating through the space between the containment vessel and cylindrical baffle 28. The air inlets include regenerative heat exchangers as described above.

The above describe liquid metal reactors 60 and 150 eliminate the potential for corrosion within the spaces and structures which guide outside air past the reactor containment vessels to transfer reactor core decay heat from reactors 60 and 150 to the ambient air outside reactors 60 and 150 by utilizing the removed heat to raise the temperature of the incoming air above the dew point. The heat is transferred by air-to-air heat exchangers 120 or by a co-axial arrangement of the air inlet and air outlet conduits in reactors 60 and 150. Also, in the event that both the reactor and containment vessels fail, decay heat will continue to be removed, and a radiological release from reactors 60 and 150 will be prevented by closing inlet dampers 121 and 175, and outlet dampers 122 and 177 respectively. Decay heat removal following such a double vessel leak is provided by the reactor vault cooling system which is designed to permit convective cooling of the guard vessel which has been filled with sodium due to the double vessel breach. A radiological release through the inlet and outlet conduits is prevented by closing the inlet and outlet dampers to seal the system and extinguish a possible sodium pool fire by preventing oxygen and water vapor from reaching the sodium pool. Also, reactors 60 and 150 provide a lower cost method of supporting the reactor deck from which the primary vessel(s) are hung.

While the invention has been described and illustrated in terms of various specific embodiments, those skilled in the art will recognize that the invention can be practiced with modification within the spirit and scope of the claims.

What is claimed is:

1. A nuclear reactor comprising a concrete reactor vault, at least one primary vessel located in said reactor vault and coupled to a reactor shield deck, and a heat removal system, each primary vessel substantially surrounded by a containment vessel in a spaced apart relationship, and comprising a reactor core submerged in a pool of liquid metal coolant, said heat removal system comprising:

at least one guard vessel, each guard vessel substantially surrounding a corresponding containment vessel in a spaced apart relationship, and comprising a support skirt configured to rest on a base mat of said reactor vault, each said guard vessel coupled to and supporting said reactor shield deck;

at least one inlet conduit in fluid communication with the ambient atmosphere outside said nuclear reactor;

at least one outlet conduit in fluid communication with the ambient atmosphere outside said nuclear reactor;

a first fluid flow heat transferring flowpath for the passage of air coolant from the ambient atmosphere outside said nuclear reactor, said flowpath comprising said at least one inlet conduit, the space intermediate said guard vessel of each primary vessel and said containment vessel of each primary vessel, and said at least one outlet conduit; and at least one regenerative heat exchanger in said first flowpath to elevate the temperature of said air coolant so that the temperature remains above the dew point temperature as said air coolant flows through said first flowpath, said at least one regenerative heat exchanger located upstream of the space intermediate said guard vessel and said containment vessel.

2. A nuclear reactor in accordance with claim 1 wherein said at least one heat exchanger in said first flowpath comprises at least one corrosion resistant gas-to-gas heat exchanger.

3. A nuclear reactor in accordance with claim 1 wherein said at least one regenerative heat exchanger in said first flowpath comprises said outlet conduit positioned inside said inlet conduit, and coaxial with said inlet conduit, said outlet conduit comprising an outer wall, said outlet conduit outer wall transferring heat to said air coolant flowing through said inlet conduit to heat said air coolant above the dew point temperature.

4. A nuclear reactor in accordance with claim 1 wherein said heat removal system further comprises a cylindrical baffle wall substantially encircling each said containment vessel in a spaced apart relationship, and said first flowpath comprises said at least one inlet conduit, the space intermediate said guard vessel of each primary vessel and said cylindrical baffle wall, the space intermediate said cylindrical baffle wall and said containment vessel of each primary vessel, and said at least one outlet conduit.

5. A nuclear reactor in accordance with claim 1 wherein said heat removal system further comprises a second fluid flow heat transferring flowpath for the passage of air coolant from the ambient atmosphere outside said nuclear reactor into and out of said reactor vault, said second flowpath comprising at least one vault inlet conduit, the space intermediate said guard vessel and said concrete reactor vault, at least one vault outlet conduit, and at least one regenerative heat exchanger in said second flowpath to elevate the temperature of said air coolant so that the temperature remains above the dew point temperature as said air coolant flows through said second flowpath.

6. A nuclear reactor in accordance with claim 5 wherein said at least one heat exchanger in said second flowpath comprises at least one corrosion resistant gas-to-gas heat exchanger.

7. A nuclear reactor in accordance with claim 5 wherein said at least one regenerative heat exchanger in said second flowpath comprises said vault outlet conduit positioned inside said vault inlet conduit, and coaxial with said vault inlet conduit, said vault outlet conduit comprising an outer wall, said vault outlet conduit outer wall transferring heat to said air coolant flowing through said vault inlet conduit to heat said air coolant above the dew point temperature.

8. A nuclear reactor in accordance with claim 1 further comprising at least one primary heat transferring liquid metal coolant loop, said coolant loop comprising a pump component housed in a vessel, a heat exchanger component housed in a vessel and a plurality of top entry loop conduits connecting in series said primary vessel, said pump component vessel, and said heat exchanger vessel, each said component vessel substantially surrounded by a containment vessel in a spaced apart relationship.

9. A nuclear reactor in accordance with claim 8 wherein said heat removal system further comprises a guard vessel substantially surrounding each said primary heat transferring liquid metal coolant loop component vessel.

10. A nuclear reactor in accordance with claim 9 wherein said first flowpath further comprises a space intermediate said guard vessel of each component vessel and said containment vessel of each component vessel.

11. A nuclear reactor in accordance with claim 9 wherein said second flowpath further comprises a space intermediate said guard vessel of each component vessel and said concrete reactor vault.

12. A nuclear reactor in accordance with claim 1 wherein said heat removal system further comprises a damper in each said inlet conduit and each said outlet conduit.

13. A nuclear reactor comprising a concrete reactor vault, at least one primary vessel located in said reactor vault and coupled to a reactor shield deck, and a heat removal system, each primary vessel substantially surrounded by a containment vessel in a spaced apart relationship, and comprising a reactor core submerged in a pool of liquid metal coolant, said heat removal system comprising:

a cylindrical baffle wall substantially encircling each said containment vessel in a spaced apart relationship;

at least one guard vessel, each guard vessel substantially surrounding a corresponding containment vessel and cylindrical baffle in a spaced apart relationship, each said guard vessel in fluid communication with an adjacent guard vessel, each said guard vessel comprising a support skirt configured to rest on a base mat of said reactor vault, each said guard vessel coupled to and supporting said reactor shield deck;

at least one inlet conduit in fluid communication with the ambient atmosphere outside said nuclear reactor;

at least one outlet conduit in fluid communication with the ambient atmosphere outside said nuclear reactor;

a first fluid flow heat transferring flowpath for the passage of air coolant from the ambient atmosphere outside said nuclear reactor, said first flowpath comprising said at least one inlet conduit, the space intermediate said guard vessel of each primary vessel and said cylindrical baffle wall, the space intermediate said cylindrical baffle wall and said containment vessel of each primary vessel, and said at least one outlet conduit; and at least one regenerative heat exchanger in said first flowpath to elevate the temperature of said air coolant so that the temperature remains above the dew point temperature as said air coolant flows through said first flowpath, said at least one regenerative heat exchanger located upstream of the space intermediate said guard vessel and said cylindrical baffle wall, and the space intermediate said cylindrical baffle wall and said containment vessel.

14. A nuclear reactor in accordance with claim 13 wherein said at least one heat exchanger in said first flowpath comprises at least one corrosion resistant gas-to-gas heat exchanger.

15. A nuclear reactor in accordance with claim 13 wherein said at least one regenerative heat exchanger in said first flowpath comprises said outlet conduit positioned inside said inlet conduit, and coaxial with said inlet conduit, said outlet conduit comprising an outer wall, said outlet conduit outer wall transferring heat to said air coolant flowing through said inlet conduit to heat said air coolant above the dew point temperature.

16. A nuclear reactor in accordance with claim 13 wherein said heat removal system further comprises a second fluid flow heat transferring flowpath for the passage of air coolant from the ambient atmosphere outside said nuclear reactor into and out of said reactor vault, said second flowpath comprising at least one vault inlet conduit, the space intermediate said guard vessel and said concrete reactor vault, at least one vault outlet conduit, and at least one regenerative heat exchanger in said second flowpath to elevate the temperature of said air coolant so that the temperature remains above the dew point temperature as said air coolant flows through said second flowpath.

17. A nuclear reactor in accordance with claim 16 wherein said at least one heat exchanger in said second flowpath comprises at least one corrosion resistant gas-to-gas heat exchanger.

18. A nuclear reactor in accordance with claim 16 wherein said at least one regenerative heat exchanger in said second flowpath comprises said vault outlet conduit positioned inside said vault inlet conduit, and coaxial with said vault inlet conduit, said vault outlet conduit comprising an outer wall, said vault outlet conduit outer wall transferring heat to said air coolant flowing through said vault inlet conduit to heat said air coolant above the dew point temperature.

19. A nuclear reactor in accordance with claim 13 wherein said heat removal system further comprises a damper in each said inlet conduit and each said outlet conduit.

20. A nuclear reactor comprising a concrete reactor vault, at least one primary vessel located in said reactor vault and coupled to a reactor shield deck, and a heat removal system, each primary vessel substantially surrounded by a containment vessel in a spaced apart relationship, and comprising a reactor core submerged in a pool of liquid metal coolant, said heat removal system comprising:

a cylindrical baffle wall substantially encircling each said containment vessel in a spaced apart relationship;

at least one guard vessel, each guard vessel substantially surrounding a corresponding containment vessel and cylindrical baffle in a spaced apart relationship, each said guard vessel in fluid communication with an adjacent guard vessel, each said guard vessel comprising a support skirt configured to rest on a base mat of said reactor vault, each said guard vessel coupled to and supporting said reactor shield deck;

at least one inlet conduit in fluid communication with the ambient atmosphere outside said nuclear reactor;

at least one outlet conduit in fluid communication with the ambient atmosphere outside said nuclear reactor;

a first fluid flow heat transferring flowpath for the passage of air coolant from the ambient atmosphere outside said nuclear reactor, said flowpath comprising said at least one inlet conduit, the space intermediate said guard vessel of each primary vessel and said concrete reactor vault, and said at least one outlet conduit; and at least one regenerative heat exchanger in said first flowpath to elevate the temperature of said air coolant so that the temperature remains above the dew point temperature as said air coolant flows through said first flowpath, said at least one regenerative heat exchanger located upstream of the space intermediate said guard vessel and said concrete reactor vault.

21. A nuclear reactor in accordance with claim 20 wherein said at least one heat exchanger in said first flowpath comprises at least one corrosion resistant gas-to-gas heat exchanger.

22. A nuclear reactor in accordance with claim 20 wherein said at least one regenerative heat exchanger in said first flowpath comprises said outlet conduit positioned inside said inlet conduit, and coaxial with said inlet conduit, said outlet conduit comprising an outer wall, said outlet conduit outer wall transferring heat to said air coolant flowing through said inlet conduit to heat said air coolant above the dew point temperature.

23. A nuclear reactor comprising a concrete reactor vault, at least one primary vessel located in said reactor vault and coupled to a reactor shield deck, and a heat removal system, each primary vessel substantially surrounded by a containment vessel in a spaced apart relationship, and comprising a reactor core submerged in a pool of liquid metal coolant, said heat removal system comprising:

at least one inlet conduit in fluid communication with the ambient atmosphere outside said nuclear reactor;

at least one outlet conduit in fluid communication with the ambient atmosphere outside said nuclear reactor;

a first fluid flow heat transferring flowpath for the passage of air coolant from the ambient atmosphere outside said nuclear reactor, said flowpath comprising said at least one inlet conduit, the space intermediate said containment vessel of each primary vessel and said primary vessel, and said at least one outlet conduit; and at least one regenerative heat exchanger in said first flowpath to elevate the temperature of said air coolant so that the temperature remains above the dew point temperature as said air coolant flows through said first flowpath, said at least one regenerative heat exchanger located upstream of the space intermediate said containment vessel and said primary vessel.

* * * * *